United States Patent
Yang et al.

(10) Patent No.: US 11,023,343 B2
(45) Date of Patent: Jun. 1, 2021

(54) METHOD FOR INJECTING DELIBERATE ERRORS INTO PCIE DEVICE FOR TEST PURPOSES, APPARATUS APPLYING METHOD, AND COMPUTER READABLE STORAGE MEDIUM FOR CODE OF METHOD

(71) Applicant: HONGFUJIN PRECISION ELECTRONICS (TIANJIN) CO., LTD., Tianjin (CN)

(72) Inventors: Cheng-Da Yang, Neihu (TW); Yen-Hsuan Chen, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 205 days.

(21) Appl. No.: 16/410,058

(22) Filed: May 13, 2019

(65) Prior Publication Data
US 2020/0319987 A1    Oct. 8, 2020

(51) Int. Cl.
*G06F 11/263*    (2006.01)
*G06F 13/42*    (2006.01)
*G06F 11/22*    (2006.01)

(52) U.S. Cl.
CPC .......... *G06F 11/263* (2013.01); *G06F 11/221* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| 10,261,880 B1 * | 4/2019 | Levin ................. G06F 11/2221 |
| 2007/0174679 A1 * | 7/2007 | Chelstrom .......... G06F 11/2236 714/6.13 |
| 2008/0163005 A1 * | 7/2008 | Sonksen ............... G06F 11/221 714/41 |

\* cited by examiner

Primary Examiner — Matthew M Kim
Assistant Examiner — Kyle Emanuele
(74) Attorney, Agent, or Firm — ScienBiziP, P.C.

(57) ABSTRACT

A method for injecting specific errors of both correctable and non-correctable types into a PCIE device for testing purposes during fabrication stage constructs an error injecting platform based on received target information. The platform includes a control system and at least one testing system. Disabling a security boot in the connected testing system and obtaining information of the specified driver. The obtained information comprises objects to be tested according to selection, each object having a bus address and a PCIE port value. The object under test is controlled to inject a specified error, the injection and result of injection being reported by the processor and analyzed.

18 Claims, 4 Drawing Sheets

METHOD FOR INJECTING DELIBERATE ERRORS INTO PCIE DEVICE FOR TEST PURPOSES, APPARATUS APPLYING METHOD, AND COMPUTER READABLE STORAGE MEDIUM FOR CODE OF METHOD

FIELD

The subject matter herein generally relates to error-testing of PCIE devices.

BACKGROUND

Peripheral component interconnect express (PCIE) devices are used in a server system for connecting a central processor unit (CPU) and input/output bus of other devices. PCIE devices can be inserted individually into slots of the server system. During the development and fabrication processes, the reliability, availability, and serviceability (RAS) of the server system needs to be tested. An ITP tool for injecting correctable errors has a high price and non-correctable errors cannot be injected.

Thus, there is room for improvement in the art.

BRIEF DESCRIPTION OF THE FIGURES

Implementations of the present disclosure will be described, by way of embodiment, with reference to the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one." Embodiments of the present disclosure are described with reference to the drawings.

The present disclosure describes a method for injecting errors into a PCIE device, the errors injected may be correctable or non-correctable.

Figure 1:
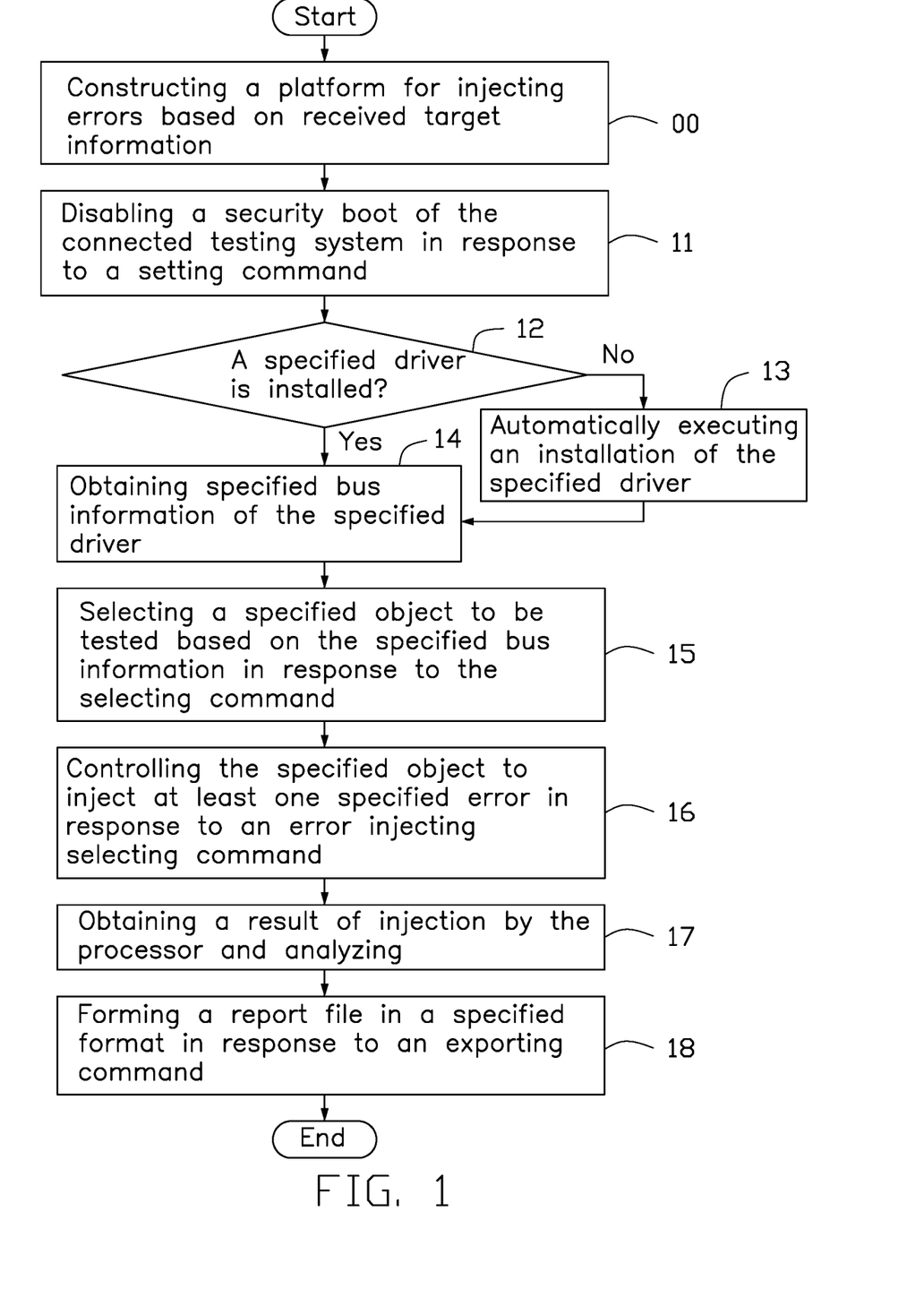
FIG. 1 is a flowchart illustrating an embodiment of a method for injecting an error into a PCIE device.

FIG. 1 shows a flowchart of a method for the above. The method is used in a system for injecting errors into a PCIE device. The system includes at least one terminal device and a server. Data between the at least one terminal device and the server is transmitted by a specified protocol. In one embodiment, the specified protocol can be a Hyper Text Transfer Protocol (HTTP), or a Hyper Text Transfer Protocol over Secure Socket Layer (HTTPS), not being limited hereto. In one embodiment, the server can be a single server, or can be a group of servers with different functions. The terminal device can be a movable terminal with a networking function, such a personal computer, a tablet, a smart phone, a personal digital assistant (PDA), a game machine, an internet protocol television (IPTV), a smart wearable device, or a navigator. The terminal device can be a fixed terminal with a networking function, such as a desktop computer or a digital television. The method may comprise at least the following steps, which also may be re-ordered:

Step 00, constructing a platform for injecting errors based on received target information.

In one embodiment, the platform includes a control system and at least one testing system. The control system and the testing system communicates through a switch. The switch can switch the connections between the control system and the at least one testing system. The at least one testing system includes a PCIE device. The control system includes a baseboard management controller (BMC).

In one embodiment, the target information includes testing system information and controlling system information. The testing system information (TSinformation) can include an IP address, a user name, and a password, not being limited. The controlling system information (CSinformation) can include a BMC IP address, a user name, and a password, not being limited.

Step 11, disabling a security boot of the connected testing system in response to a setting command.

In one embodiment, the method is applied in BIOS mode.

Step 12, determining whether a specified driver is installed in response to a determining command.

In one embodiment, the specified driver is a PLX driver.

Step 13, when no specified driver is installed, automatically executing an installation of the specified driver.

Step 14, when the specified driver is installed, obtaining specified bus information of the specified driver.

In one embodiment, the specified bus information can include a plurality of objects to be tested. Each object includes a bus address and a port value.

Step 15, selecting a specified object to test based on the specified bus information in response to the selecting command.

Step 16, controlling the specified object to inject at least one specified error in response to an error injecting selecting command.

In one embodiment, correctable and non-correctable error types are provided. The correctable error type corresponds to a first type code, such as "1", there may be multiple correctable errors in this type. Each correctable error corresponds to a first specified identified value. The correctable errors include Receiver Error Status, Bad TLP Status, Bad DLLP Status, Replay NUM Rollover Status, Replay Timer Timeout Status, Advisory Non-Fatal Error Status, Corrected Internal Error Status, and Header Log Overflow Status, but not being limited.

The non-correctable error type corresponds to a second type code, such as "2" and there are multiple non-correctable errors in this type. Each non-correctable error corresponds to a second specified identified value. The non-correctable errors include Data Link Protocol Error Status, Surprise Down Error Status, Poisoned TLP Status, Flow Control Protocol Error Status, Completion Timeout Status, Completer Abort Status, Unexpected Completion Status, Receiver Overflow Status, Malformed TLP Status, ECRC Error Status, Unsupported Request Error Status, ACS Violation Status, Uncorrectable Internal Error Status, MC Blocked TLP, and Atomic Operation Egress Blocked Status, but not being limited.

Figure 2:
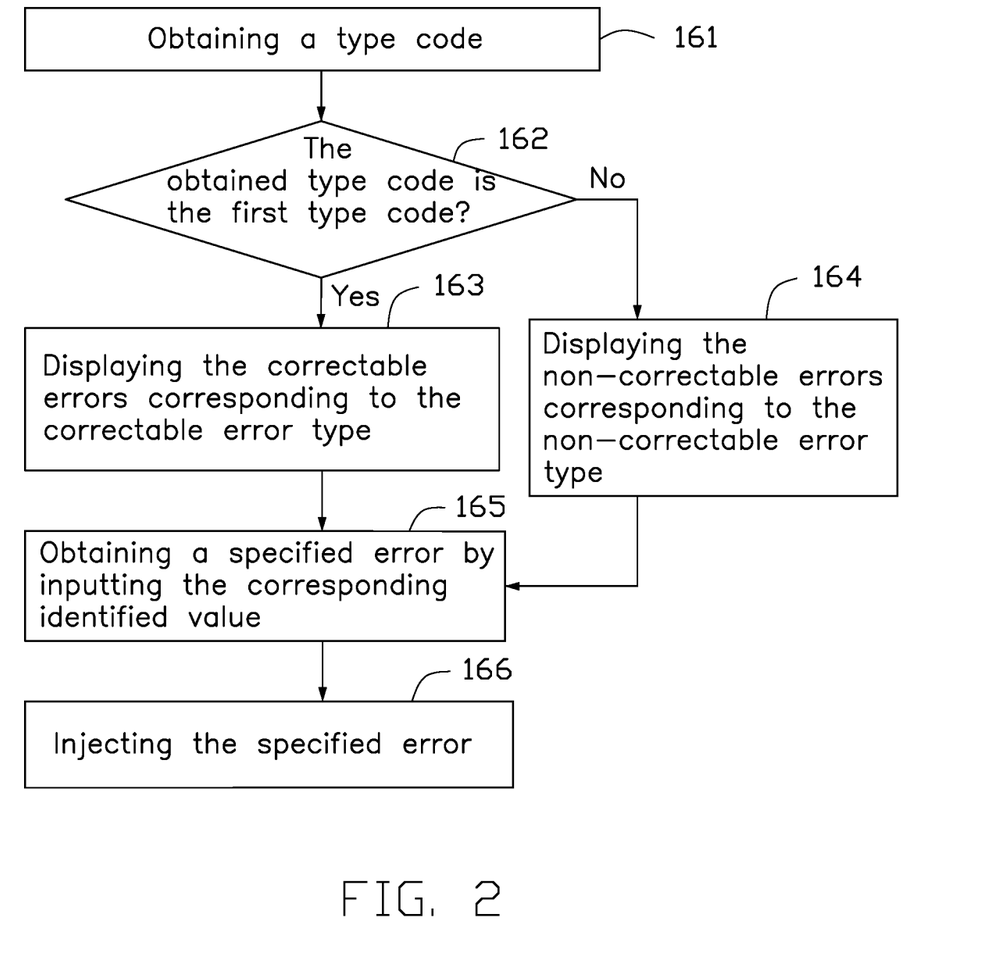
FIG. 2 is a flowchart illustrating the step 16 of FIG. 1.

As shown in FIG. 2, the step of controlling the specified object to inject at least one specified error in response to an error injecting selecting command further comprises:

Step 161, obtaining a type code;

Step 162, determining whether the obtained type code is the first type code.

Step 163, when the obtained type code is the first type code, displaying the correctable errors corresponding to the correctable error type.

Step 164, when the obtained type code is the second type code, displaying the non-correctable errors corresponding to the non-correctable error type.

Step 165, obtaining a specified error by inputting the corresponding identified value.

Step 166, injecting the specified error.

In one embodiment, the first type code is different from the second type code. The first type code is "1", and the second type code is "2".

Step 17, obtaining a result of injection by the processor and analyzing.

In one embodiment, the analyzing operation is executed by searching for a record in the specified storage for determining success or non-success of the error injection.

Step 18, forming a report file in a specified format in response to an exporting command.

In one embodiment, the specified format is a CSV format or a LOG format. The report file records the result of injection and the log of the injection.

Based on the above method, the correctable errors and the non-correctable errors are injected into the PCIE device, and the RAS of the server system is improved, reducing cost.

Figure 3:
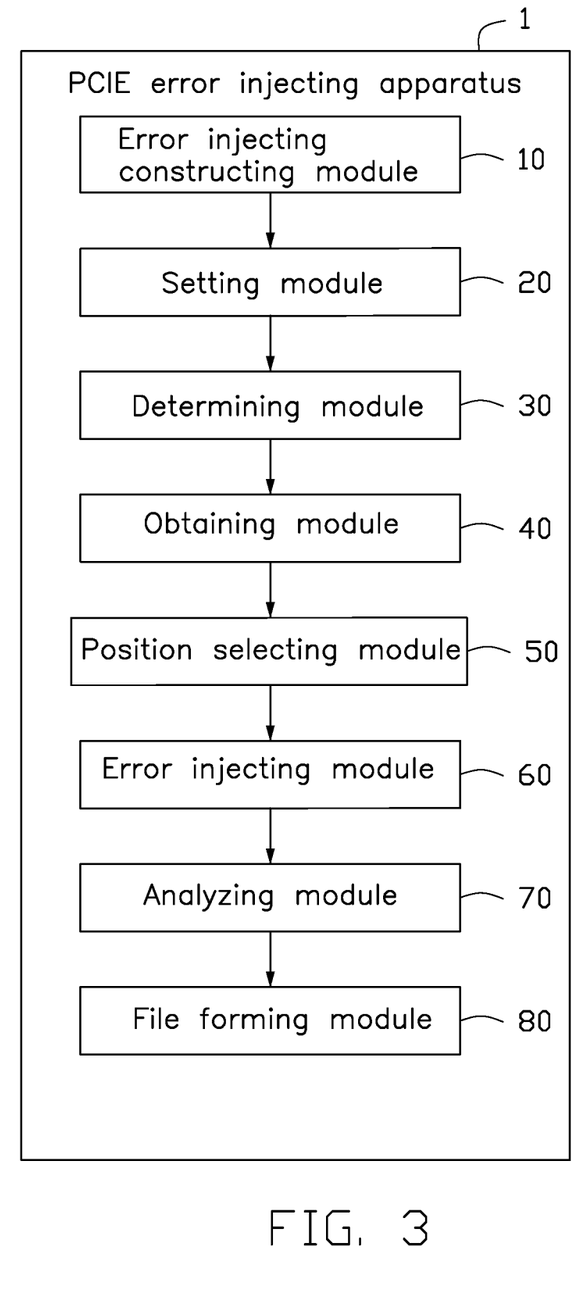
FIG. 3 is a diagram illustrating an embodiment of an apparatus for injecting the error.

FIG. 3 illustrates a PCIE error injecting apparatus 1. The apparatus 1 can include an error injecting constructing module 10, a setting module 20, a determining module 30, an obtaining module 40, a position selecting module 50, an error injecting module 60, an analyzing module 70, and a file forming module 80.

The error injecting constructing module 10 constructs an error injecting platform based on received target information.

In one embodiment, the error injecting platform includes a control system and at least one testing system. The control system and the testing system communicate with each other through a switch. The switch can switch the connections between the control system and the at least one testing system. The at least one testing system includes a PCIE device. The control system includes a baseboard management controller (BMC).

In one embodiment, the target information includes TSinformation and CSinformation. The TSinformation can include IP address, a user name, and password, not being limited. The CSinformation can include BMC IP address, a user name, and password, not being limited.

The setting module 20 disables a security boot in the connected testing system in response to a setting command.

In one embodiment, the method is applied in a BIOS mode.

The determining module 30 determines whether a specified driver is installed in response to a determining command.

In one embodiment, the specified driver is a PLX driver.

When there is no specified driver, the determining module 30 automatically executes an installation of the specified driver.

The obtaining module 40 obtaining specified bus information of the specified driver when the specified driver is installed.

In one embodiment, the specified bus information can include information as to many objects for testing. Each object includes a bus address and a port value.

The position selecting module 50 selects a specified object for testing based on the specified bus information in response to the selecting command.

The error injecting module 60 controls the specified object to inject at least one specified error in response to an error injecting selecting command.

In one embodiment, a correctable error type and a non-correctable error type are provided. The correctable error type corresponds to a first type code, such as "1", there may be multiple specific errors in the type. Each correctable error corresponds to a first specified identified value. The correctable errors include Receiver Error Status, Bad TLP Status, Bad DLLP Status, Replay NUM Rollover Status, Replay Timer Timeout Status, Advisory Non-Fatal Error Status, Corrected Internal Error Status, and Header Log Overflow Status, but not being limited. The non-correctable error type corresponds to a second type code, such as "2", there may be multiple specific errors in this type also. Each non-correctable error corresponds to a second specified identified value. The non-correctable errors include Data Link Protocol Error Status, Surprise Down Error Status, Poisoned TLP Status, Flow Control Protocol Error Status, Completion Timeout Status, Completer Abort Status, Unexpected Completion Status, Receiver Overflow Status, Malformed TLP Status, ECRC Error Status, Unsupported Request Error Status, ACS Violation Status, Uncorrectable Internal Error Status, MC Blocked TLP, and Atomic Operation Egress Blocked Status, but not being limited.

The error injecting module 60 further obtains a type code, and determines whether the obtained type code is the first type code.

When the obtained type code is the first type code, the error injecting module 60 displays the correctable errors corresponding to the type.

When the obtained type code is the second type code, the error injecting module 60 displays the non-correctable errors corresponding to the type.

The error injecting module 60 obtains a specified error by inputting the identified value, and injects the specified error.

In one embodiment, the first type code is different from the second type code. The first type code is "1", and the second type code is "2".

The analyzing module 70 obtains a result of injection by the processor and analyzes the same.

In one embodiment, the analyzing operation is executed by searching for a record in the specified storage for determining success or non-success of the operation.

The file forming module 80 forms a report file in a specified format in response to an exporting command.

In one embodiment, the specified format is a CSV format or a LOG format. The report file records the result of injection and the log of the injection.

Based on the above structure, the correctable errors and the non-correctable errors are injected into the PCIE device, and the RAS of the server system is improved, reducing cost.

Figure 4:
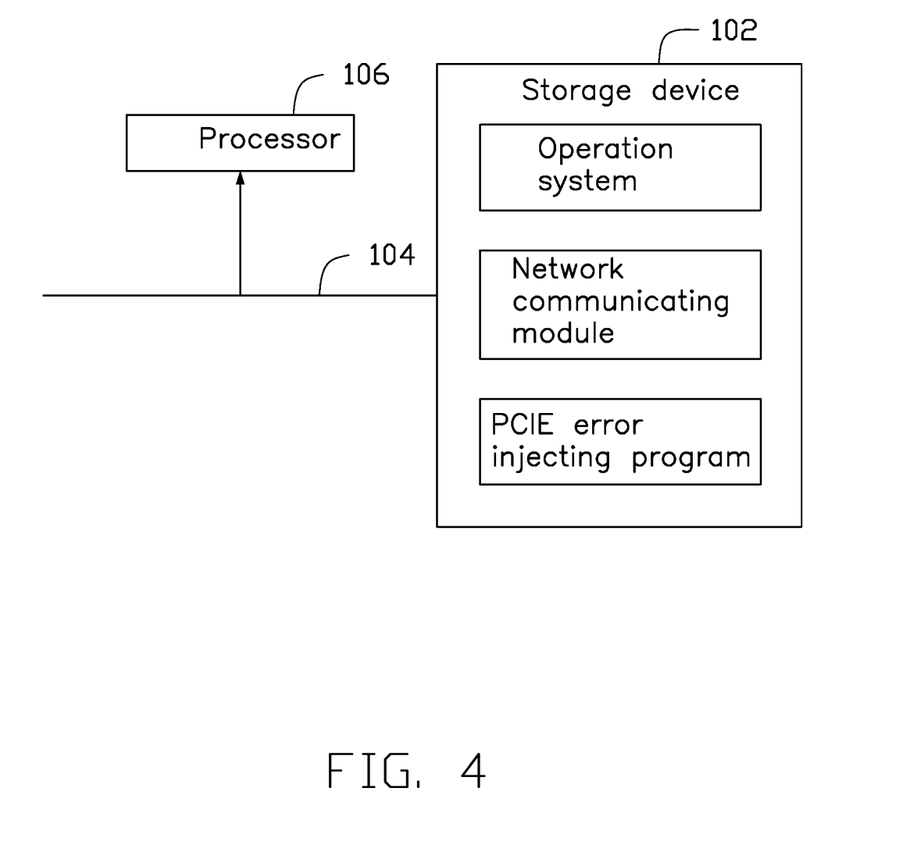
FIG. 4 is a diagram illustrating an embodiment of a hardware operating environment of a computer readable storage medium.

FIG. 4 illustrates a storage medium of a hardware operating environment. A computer readable storage medium stores an error injecting system. The storage medium is a computer readable storage medium. The storage medium includes a storage device 102 and a processor 106. The storage device 102 communicates with the processor 106 by a bus 104. The storage device 102 stores a plurality of codes, and the codes can be executed by at least one processor 106 to run the above method.

The storage device 102 stores program codes. The storage device 102 can be an integrated circuit having storage function, such as a read-access memory (RAM) or a first in first out (FIFO). The storage device 102 can be a memory in a physical form, such as a memory card, a trans-flash card, a smart media card, a secure digital card, or a flash card. The storage device 102 communicates with the processor 106 by the bus 104. The storage device 102 can includes an operating system, a network communicating module, and a PCIE error injecting program. The operating system manages and controls hardware devices and software programs, and supports the running of the PCIE error injecting program and other programs. The network communicating module communicates between the different modules, or between the hardware devices and the software programs.

The processor 106 can be a microprocessor or a digital processor. The processor 106 is used for running the program codes stored in the storage device 102 to execute different functions. The steps in FIG. 1 are stored as codes in the storage device 102, and the processor 106 executes the stored codes to perform the above method. The processor 106 can be a central processing unit (CPU), or a large scale integrated circuit, being an operating core and a control core.

The processor executes a plurality of commands stored in the storage device 102 to perform the method. The commands executed by the processor 106 perform the following steps:

Step 10, constructing an error injecting platform based on received target information.

In one embodiment, the error injecting platform includes a control system and at least one testing system. The control system and the testing system communicate with each other through a switch. The switch can switch the connections between the control system and the at least one testing system. The at least one testing system includes a PCIE device. The control system includes a baseboard management controller (BMC).

In one embodiment, the target information includes TSinformation and CSinformation. The TSinformation can include IP address, a user name, and password, not being limited. The CSinformation can include BMC IP address, a user name, and password, not being limited.

Step 11, disabling a security boot of the connected testing system in response to a command.

In one embodiment, the method is operated in a BIOS mode.

Step 12, determining whether a specified driver is installed in response to a determining command.

In one embodiment, the specified driver is a PLX driver.

Step 13, when there is no specified driver, automatically executing an installation of the specified driver.

Step 14, when the specified driver is installed, obtaining specified bus information of the specified driver.

In one embodiment, the specified bus information can include a plurality of objects to be tested. Each object includes a bus address and a port value.

Step 15, selecting a specified object based on the specified bus information in response to the selecting command.

Step 16, controlling the specified object to inject at least one specified error in response to an error injecting selecting command.

In one embodiment, a correctable error type and a non-correctable error type are provided. The correctable error type corresponds to a first type code, such as "1", there may be multiple specific errors in the type. Each correctable error corresponds to a first specified identified value. The correctable errors include Receiver Error Status, Bad TLP Status, Bad DLLP Status, Replay NUM Rollover Status, Replay Timer Timeout Status, Advisory Non-Fatal Error Status, Corrected Internal Error Status, and Header Log Overflow Status, not being limited. The non-correctable error type corresponds to a second type code, such as "2", there may be multiple specific errors in this type also. Each non-correctable error corresponds to a second specified identified value. The non-correctable errors include Data Link Protocol Error Status, Surprise Down Error Status, Poisoned TLP Status, Flow Control Protocol Error Status, Completion Timeout Status, Completer Abort Status, Unexpected Completion Status, Receiver Overflow Status, Malformed TLP Status, ECRC Error Status, Unsupported Request Error Status, ACS Violation Status, Uncorrectable Internal Error Status, MC Blocked TLP, and Atomic Operation Egress Blocked Status, but not being limited.

As shown in FIG. 2, the step of controlling the specified object to inject at least one specified error in response to an error injecting selecting command further comprises:

Step 161, obtaining a type code;

Step 162, determining whether the obtained type code is the first type code.

Step 163, when the obtained type code is the first type code, displaying the correctable errors corresponding to the correctable error type.

Step 164, when the obtained type code is the second type code, displaying the non-correctable errors corresponding to the non-correctable error type.

Step 165, obtaining a specified error by inputting the identified value.

Step 166, injecting the specified error.

In one embodiment, the first type code is different from the second type code. The first type code is "1", and the second type code is "2".

Step 17, obtaining a result of the injection from the processor and analyzing same.

In one embodiment, the analyzing operation is executed by searching for a record in the specified storage for determining success or non-success of the injection.

Step 18, forming a report file in a specified format in response to an exporting command.

In one embodiment, the specified format is a CSV format or a LOG format. The report file records the result of injection and the log of injection.

Based on the above method, the correctable errors and the non-correctable errors are injected into the PCIE device, and the RAS of the server system is improved, reducing cost.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A PCIE error injecting method comprising:
constructing a platform for injecting errors based on received target information; the platform comprises a control system and at least one testing system;
disabling a security boot of the connected testing system in response to a setting command;
obtaining specified bus information of a specified driver; the specified bus information comprises a plurality of objects; each object comprises a bus address and a port value;
selecting a specified object to be tested based on the specified bus information in response to a selecting command;
controlling the specified object to inject at least one specified error in response to an error injecting selecting command; and
obtaining a result of the injection by a processor and analyzing;
wherein the specified error is a non-correctable error type.

2. The PCIE error injecting method of claim 1, wherein there are a correctable error type and a non-correctable error type; and each error type corresponds to multiple errors; the correctable error type corresponds to a first type code, and the non-correctable error type corresponds to a second type code; each error corresponds to an identified value; the step of controlling the specified object to inject at least one specified error in response to an error injecting selecting command comprising:
obtaining a type code;
determining whether the obtained type code is the first type code;
when the obtained type code is the first type code, displaying the correctable errors corresponding to the correctable error type;
when the obtained type code is the second type code, displaying the non-correctable errors corresponding to the non-correctable error type;
obtaining a specified error by inputting the corresponding identified value; and
injecting the specified error.

3. The PCIE error injecting method of claim 1, wherein before the step of obtaining specified bus information of the specified driver, the PCIE error injecting method further comprising:
determining whether a specified driver is installed in response to a determining command; and
when no specified driver is installed, automatically executing an installation of the specified driver.

4. The PCIE error injecting method of claim 1, wherein the target information comprises a testing system information and a controlling system information; the testing system information comprises an IP address, a user name, and a password; the controlling system information comprises a BMC IP address, a user name, and a password.

5. The PCIE error injecting method of claim 1, wherein the PCIE error injecting method further comprising:
forming a report file in a specified format in response to an exporting command.

6. The PCIE error injecting method of claim 5, wherein the analyzing operation is executed by searching a record in a specified storage device for determining success or non-success of the error injection.

7. A PCIE error injecting apparatus comprising:
a processor; and
a storage medium storing one or more programs, which, when executed by the processor, cause the processor to:
construct an error injecting platform based on received target information; the error injecting platform comprises a control system and at least one testing system;
set a security boot in a disable state of the connected testing system in response to a setting command;
obtain specified bus information of the specified driver; the specified bus information comprises a plurality of objects; each object comprises a bus address and a port value;
select a specified object to be tested a based on the specified bus information in response to a selecting command;
control the specified object to inject at least one specified error in response to an error injecting selecting command; and
obtain a result of the injecting processor and analyze;
wherein the specified error is a non-correctable error type.

8. The PCIE error injecting apparatus of claim 7, wherein there are a correctable error type and a non-correctable error type; and each error type corresponds to multiple errors; the correctable error type corresponds to a first type code, and the non-correctable error type corresponds to a second type code; each error corresponds to an identified value; the processor obtains a type code and determines whether the obtained type code is the first type code; when the obtained type code is the first type code, the processor displays the correctable errors corresponding to the correctable error type; when the obtained type code is the second type code, the processor displays the non-correctable errors corresponding to the non-correctable error type; the processor obtains a specified error by inputting the corresponding identified value; the processor injects the specified error.

9. The PCIE error injecting apparatus of claim 7, wherein the processor determines whether a specified driver is installed in response to a determining command; when no specified driver is installed, the processor automatically executing an installation of the specified driver.

10. The PCIE error injecting apparatus of claim 7, wherein the target information comprises a testing system information and a controlling system information; the testing system information comprises an IP address, a user name, and a password; the controlling system information comprises a BMC IP address, a user name, and a password.

11. The PCIE error injecting apparatus of claim 7, wherein the processor forms a report file in a specified format in response to an exporting command.

12. The PCIE error injecting apparatus of claim 11, wherein the analyzing operation is executed by searching a record in a specified storage device for determining success or non-success of the error injection.

13. A non-transitory computer readable storage medium, wherein the computer readable storage medium stores a system for injecting PCIE errors, when being executed by at least one processor, the system performs the following steps:

constructing a platform for injecting errors based on received target information; the platform comprises a control system and at least one testing system;

disabling a security boot of the connected testing system in response to a setting command;

obtaining specified bus information of a specified driver; the specified bus information comprises a plurality of objects; each object comprises a bus address and a port value;

selecting a specified object to be tested based on the specified bus information in response to a selecting command;

controlling the specified object to inject at least one specified error in response to an error injecting selecting command; and obtaining a result of the injection by a processor and analyzing;

wherein the specified error is a non-correctable error type.

14. The non-transitory computer readable storage medium of claim 13, wherein there are a correctable error type and a non-correctable error type; and each error type corresponds to multiple errors; the correctable error type corresponds to a first type code, and the non-correctable error type corresponds to a second type code; each error corresponds to an identified value; the step of controlling the specified object to inject at least one specified error in response to an error injecting selecting command comprising:

obtaining a type code;

determining whether the obtained type code is the first type code;

when the obtained type code is the first type code, displaying the correctable errors corresponding to the correctable error type;

when the obtained type code is the second type code, displaying the non-correctable errors corresponding to the non-correctable error type;

obtaining a specified error by inputting the corresponding identified value; and injecting the specified error.

15. The non-transitory computer readable storage medium of claim 13, wherein before the step of obtaining specified bus information of the specified driver, the PCIE error injecting method further comprising:

determining whether a specified driver is installed in response to a determining command; and when no specified driver is installed, automatically executing an installation of the specified driver.

16. The non-transitory computer readable storage medium of claim 13, wherein the target information comprises a testing system information and a controlling system information; the testing system information comprises an IP address, a user name, and a password; the controlling system information comprises a BMC IP address, a user name, and a password.

17. The non-transitory computer readable storage medium of claim 16, wherein the analyzing operation is executed by searching a record in a specified storage device for determining success or non-success of the error injection.

18. The non-transitory computer readable storage medium of claim 13, wherein the PCIE error injecting method further comprising:

forming a report file in a specified format in response to an exporting command.

* * * * *

UNITED STATES PATENT AND TRADEMARK OFFICE
CERTIFICATE OF CORRECTION

PATENT NO. : 11,023,343 B2
APPLICATION NO. : 16/410058
DATED : June 1, 2021
INVENTOR(S) : Cheng-Da Yang and Yen-Hsuan Chen It is certified that error appears in the above-identified patent and that said Letters Patent is hereby corrected as shown below:

On the Title Page

Column 1 Please add Item (30) regarding "Foreign Application Priority Data" with the following:
(30) Foreign Application Priority Data
Apr. 2, 2019(CN).............201910261977.1

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*